United States Patent
Pinder (10) Patent No.: US 6,644,907 B1
(45) Date of Patent: Nov. 11, 2003

(54) CART THAT RETRIEVES, TRANSPORTS, LIFTS AND EMPTIES WASTE CONTAINER

(76) Inventor: Stanley N. Pinder, P.O. Box 172516, Tampa, FL (US) 33672

( * ) Notice: Subject to any disclaimer, the term of this patent is extended or adjusted under 35 U.S.C. 154(b) by 0 days.

(21) Appl. No.: 10/064,167

(22) Filed: Jun. 17, 2002

(51) Int. Cl.[7] .............................................. B65G 65/23

(52) U.S. Cl. ..................... 414/424; 414/646; 414/648

(58) Field of Search ................. 414/424, 490, 414/648, 646, 422

(56) References Cited

U.S. PATENT DOCUMENTS

| | | | | |
|---|---|---|---|---|
| 4,348,147 A | * | 9/1982 | Helm | 414/424 |
| 4,797,050 A | * | 1/1989 | Habicht | 414/420 |
| 4,954,037 A | * | 9/1990 | Habicht | 414/422 |
| 5,379,814 A | * | 1/1995 | Posly | 414/422 |

FOREIGN PATENT DOCUMENTS

SU 1639569 * 4/1991 ............ 414/422

* cited by examiner

Primary Examiner—Thomas J. Brahan
(74) Attorney, Agent, or Firm—Ronald E. Smith; Smith & Hopen, P.A.

(57) ABSTRACT

A manually-operated cart retrieves a waste container from a compactor and transports the waste container across a support surface to a waste collection receptacle. An operator activates a winch and a belt that extends from the winch to a base frame lifts the base frame. The base frame is constrained to travel between a pair of vertically disposed channel members that form part of a back frame for the cart. A waste container rotating apparatus is secured to the base frame and is lifted with it until an immovable barrier secured to one of the channel members is encountered. Continued lifting of the base frame effects rotation of the waste container about an axis of rotation until the waste container tilts sufficiently to allow waste contained in it to fall out under the influence of gravity into the waste collection receptacle.

19 Claims, 8 Drawing Sheets

CART THAT RETRIEVES, TRANSPORTS, LIFTS AND EMPTIES WASTE CONTAINER

BACKGROUND OF INVENTION

1. Field of the Invention

This invention relates, generally, to the waste disposal industry. More particularly, it relates to a cart having a rotatable mechanism for retrieving, transporting, lifting, and emptying heavy compacted waste from a novel portable container into a large waste receptacle such as a dumpster.

2. Description of the Prior Art

Large machines called compactors are used in many industries for compacting waste materials to save space. A compactor is essentially a box with a motor-driven plate in it that compresses waste in the box. The compressed waste is then pressed into a portable waste container and the portable waste container is then transported to a dumpster.

Perhaps the most difficult part of the waste disposal process is the emptying of the portable waste container. The invention disclosed in U.S. Pat. No. 5,320,475 to the present inventor entitled "Retriever And Cart For Handling Heavy Containers" discloses a retriever that retrieves and transports multiple waste containers at one time. However, it includes no means for elevating a waste container to a preselected height and for rotating the container upon attaining that height so that the contents of the waste container may be discharged therefrom under the influence of gravity into a floor level waste receptacle.

Therefore, there is a need for an apparatus that lifts and rotates a waste container so that its contents may be dumped into a floor level waste receptacle.

The highly compressed waste in the portable waste container may also become stuck in the container. Thus, there is also a need for an improved waste container that is designed so that the compressed waste therein falls out easily when the waste container is emptied.

It is also not an easy task for a single worker to retrieve a heavy waste container from a compactor, and to transport it to a dumpster. Most systems require a worker manually place the waste container on a cart.

Thus a need exists for a retriever mechanism that enables a single worker to retrieve a waste container in the substantial absence of manual effort.

However, in view of the prior art considered as a whole at the time the present invention was made, it was not obvious to those of ordinary skill in the pertinent art how the identified needs could be efficiently and elegantly fulfilled.

SUMMARY OF INVENTION

The long-standing but heretofore unfulfilled need for an apparatus operated by a single worker that retrieves a portable waste container from a compactor, transports it to a dumpster, and that elevates and rotates the waste container to empty it into a dumpster in the substantial absence of physical exertion by the worker is now met by a new, useful, and nonobvious invention.

The novel manually-operated cart of this invention is adapted to retrieve a novel portable waste container from a compactor, transport the waste container to a dumpster, elevate the waste container to a preselected height, and to dump the contents of the waste container into a larger waste collection receptacle.

The portable waste container is novel as well because it is designed to prevent waste tightly compacted therein from becoming stuck so that it slides out easily upon tilting of the container by the novel cart.

The novel portable cart includes a vertical back frame formed primarily by a pair of parallel, transversely opposed, upstanding (vertical) channel members. A barrier means is fixedly secured to a preselected channel member of the back frame at a preselected height. The barrier means serves as a pivot point and performs the function of causing the waste container to rotate as it is lifted as more fully described hereinafter.

A pair of parallel, horizontally disposed support arms are secured to the respective lower ends of the channel members that form a part of the vertical back frame. The support arms extend from their respective channel members in cantilevered relation thereto in a forward direction. The forward end of each cantilevered support arm is supported by a rotatably mounted caster wheel and the rearward end of each cantilevered arm is supported by a primary tire.

A first and second auxiliary tire of a size smaller than the primary tires is rotatably mounted to the rearwardmost end of first and second rearwardly-extending cantilevered arms to enable an operator to safely tilt the cart back upon encountering an obstacle such as a curb.

A base frame is positioned between and adapted to movably engage the channel members so that the base frame is movable between a lower end of the back frame and an upper end of the back frame. A waste container-engaging frame is secured to the base frame. The waste container-engaging frame includes a back frame member secured to the base frame and a pair of parallel container-engaging members secured to opposite ends of the back frame. The parallel container-engaging members are mounted in cantilevered relation to the back frame member and extend in a horizontal plane in a forward direction. As used herein, the term "forward" refers to the side of the cart that supports the waste container and the term "rearward" refers to the side of the cart where the operator stands or walks when the cart is in use.

A winch means selectively lifts and lowers the base frame, and the container-engaging members that extend therefrom, along the vertical extent of the vertical back frame. The winch means may be provided in the form of a common boat winch. It is mounted on the rearward side of the vertical back frame at a preselected height so that it does not interfere with the raising and lowering of the base frame. The preselected height is selected to make the control handle of the winch easily operable by a person of ordinary height.

A waste container rotating means is secured to and supported by the base frame member. The waste container rotating means has a planar construction and is positioned in a vertical plane that is coplanar with the base frame and parallel to the plane of the vertical back frame. A track that slidingly receives the above-mentioned barrier means is formed in the waste container rotating means. The track has a vertical part, a horizontal part, and a gradual ninety-degree bend in open communication with the vertical and horizontal parts. The track is in vertical alignment with the barrier means so that the barrier means enters into the track when the winch means lifts the base frame and hence the waste container rotating means to a first preselected elevation above the barrier means.

The waste container is gradually inverted as the barrier means encounters the gradual ninety-degree bend as the winch means lifts the base frame to a second preselected elevation above the first preselected elevation. The base frame pivots about a fixed position axle member as the base member is lifted and lowered.

A waste container-engaging means holds the waste container as the waste container is rotated or tilted so that contents of the waste container fall from the waste container under the influence of gravity when the waste container is so rotated or tilted.

The novel container has four walls, each of which is preferably tapered on an inside surface thereof, first at a gradual taper as the side walls extend downwardly from the rim of the waste container and secondly at a steeper taper as the side walls approach the bottom wall of the container. Upstanding ribs that project inwardly from the side walls also serve to prevent a vacuum from forming in the waste container when a full plastic bag is pressed thereinto by a compactor.

The vertical back frame of the novel cart further includes a horizontal top frame that interconnects respective uppermost ends of the upstanding pair of channel members, a horizontal bottom frame that interconnects respective lowermost ends of said upstanding pair of channel members, and at least one horizontal interconnecting frame that interconnects the channel members at a preselected location between the top and bottom frames. The winch means is mounted to the at least one interconnecting frame.

Connection means are provided for interconnecting the winch means and the base frame so that operation of the winch means in a first direction lifts the base frame and so that operation of the winch means in a second direction lowers the base frame. The connection means is preferably provided in the form of a belt in lieu of ropes or chains.

A pulley is mounted to the horizontal top frame of the vertical back frame and the belt follows a path of travel that extends upwardly from the winch means, over the pulley with an angle of wrap nearly equal to one hundred eighty degrees, and downwardly to the base frame.

The base frame is formed by a pair of vertical base frame members that define opposite sides of the base member, a pair of horizontal base frame members that interconnect the pair of vertical base frame members to each other, and an engaging means secured to a preselected horizontal base frame member for enabling the belt to engage said preselected horizontal member of the pair of horizontal members.

A first upper wheel is engaged to an upper end of the first vertical base frame member on an outboard side thereof, a second upper wheel is engaged to an upper end of the second vertical base frame member on an outboard side thereof, a first lower wheel is engaged to a lower end of the first vertical base frame member on an outboard side thereof, and a second lower wheel is engaged to a lower end of the second vertical base frame member on an outboard side thereof. The first upper and lower wheels are disposed in engaging relation to a first channel member of the pair of vertical channel members that form the vertical back frame and the second upper and lower wheels are disposed in engaging relation to a second channel member of the pair of vertical channel members. The base frame is thereby constrained to travel upwardly and downwardly between the first and second channel members when the winch means is operated in a first direction and a second direction, respectively.

The waste container rotating means that is secured to the back frame in upstanding relation thereto includes the pair of horizontally disposed, forwardly-extending waste container-engaging arms, mentioned above, that perform the function their name expresses. A groove is formed in each arm of the pair of arms in confronting relation to one another and each groove is adapted to slidingly receive a flange formed in the waste container on opposite sides thereof. The grooves retain flanges when the waste container is rotated or tilted.

A retainer means is also provided to prevent the waste container from sliding from the grooves formed in said arms when the waste container is lifted and rotated. The retainer means includes a pair of pivotally mounted, generally "L"-shaped first and second retainers adapted to releasably engage a generally "L"-shaped lip formed in the waste container along a rearward edge thereof. A similar "L"-shaped lip is also formed along a forward edge of the waste container so that the operator may engage the novel waste container from the front or back.

The retainer means includes a plurality of truncate sleeves secured to said back frame member in longitudinally spaced apart relation to one another along the extent of the back frame member. An elongate rod means extends in ensleeved relation through each of the truncate sleeves. The elongate rod means is rotatable about a longitudinal axis of symmetry within the truncate sleeves. The "L"-shaped retainers are secured to opposite ends of the elongate rod in rotational alignment with one another. A lever is formed integrally with the first retainer and the elongate rod provides a fulcrum for the lever. A bias means holds the lever in a position of repose where the first retainer and hence the second retainer are disposed in engaging relation to the "L"-shaped lip formed in the waste container. The lever is adapted to be pivoted about the fulcrum by an operator. When pivoted out of the position of repose, the lever effects simultaneous and corresponding rotation of the elongate rod about its longitudinal axis so that the first retainer and the second retainer conjointly release the "L"-shaped lip formed in the waste container. When the lever is released, it is returned by the bias means to the position of repose where the first and second retainers engage the "L"-shaped lip and prevent sliding of the waste container from the grooves.

The novel braking means for braking the primary tires, which are preferably of the pneumatic type, include a vertically disposed, first wheel-mounting plate secured to a first channel member of the pair of channel members at a lower end thereof and a vertically disposed, second wheel-mounting plate secured to a second channel member of the pair of channel members at a lower end thereof. The first wheel-mounting plate has a first aperture formed therein near an upper end thereof, a vertically-extending slot formed substantially mid-length thereof, and a second aperture formed near a lower end thereof. The second wheel-mounting plate also has a first aperture formed therein near an upper end thereof, a vertically-extending slot formed substantially mid-length thereof, and a second aperture formed near a lower end thereof.

A mounting rod has its respective opposite ends rotatably positioned in the respective first apertures formed in the first and second wheel-mounting plates at the respective upper ends thereof. A braking rod, disposed in parallel relation to the mounting rod, has its respective opposite ends slideably positioned in the respective vertically extending slots formed in the first and second wheel-mounting plates. An axle rod has its respective opposite ends slideably positioned in the respective apertures formed in the first and second wheel-mounting plates at the respective lower ends thereof.

A first bias means is positioned in interconnecting relation between a first end of the mounting rod and a first end of the braking rod and a second bias means is positioned in interconnecting relation between a second end of the mounting rod and a second end of the braking rod.

The first and second bias means position the braking rod at the respective upper ends of the vertically extending slots when the first and second bias means are in repose. A brake means overcomes the bias means and urges the braking rod into tight frictional engagement with the primary tires so that said primary tires cannot rotate when the bias means has been overcome.

The brake means includes a first locking plate having an aperture formed in its opposite ends. The first locking plate is positioned at a first end of the mounting rod and the first end of the mounting rod is received within an upper aperture of the pair of apertures formed in the first locking plate. A second locking plate has an aperture formed in its opposite ends and is positioned at a second end of the mounting rod and the second end of the mounting rod is received within an upper aperture of the pair of apertures formed in the second locking plate. A third locking plate has an aperture formed in its opposite ends and is positioned at a first end of the braking rod. The first end of the braking rod is received within a lower aperture of the pair of apertures formed in the third locking plate. A fourth locking plate has an aperture formed in its opposite ends and is positioned at a second end of the braking rod. The second end of the braking rod is received within a lower aperture of the pair of apertures formed in the fourth locking plate.

The first and second locking plates are pivotally joined to one another at a first pivot point defined by the lower aperture of the first locking plate and the upper aperture of the second locking plate. The third and fourth locking plates are pivotally joined to one another at a second pivot point defined by the lower aperture of the third locking plate and the upper aperture of the fourth locking plate.

When the bias means is in repose, the first and second pivot points are positioned rearwardly of the braking rod and when the bias means is overcome, the first and second pivot points are positioned forwardly of the braking rod. When positioned forwardly, the opposite ends of the braking rod press tightly against the pneumatic tires to prevent their rotation. A cam-over-center locking action is achieved when the first and second pivot points are displaced from their in repose, rearwardly position to their locking, forward position so that the locking action cannot be overcome unless a force greater than the cam-over-center locking action is generated.

The means for locking the primary tires is provided in the form of a first foot-operated lever that, when depressed, drives the first and second pivot points forwardly and the means for unlocking the primary tires is provided in the form of a second foot-operated lever that, when depressed, drives the first and second pivot points rearwardly. The first lever is secured to the first locking plates and the second lever is secured to the third locking plate.

Additional structure of the invention is disclosed in the detailed description that follows.

An important object of this invention is to provide a cart that enables an operator to retrieve a waste container from a compactor in the absence of substantial physical exertion.

A further object is to provide an apparatus that enables an operator to transport a retrieved waste container to a large waste receptacle in the substantial absence of physical exertion.

Another important object is to provide a waste container that easily releases its contents when rotated for emptying.

A further object is to provide an apparatus that lifts a heavy waste container to a preselected elevation and that rotates or tilts the container so that its contents fall therefrom under force of gravity into a larger waste receptacle.

A closely related object is to accomplish the foregoing objects with an apparatus that is safe and easy to operate without requiring an operator to have special skills.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which.

DETAILED DESCRIPTION

Figure 1:
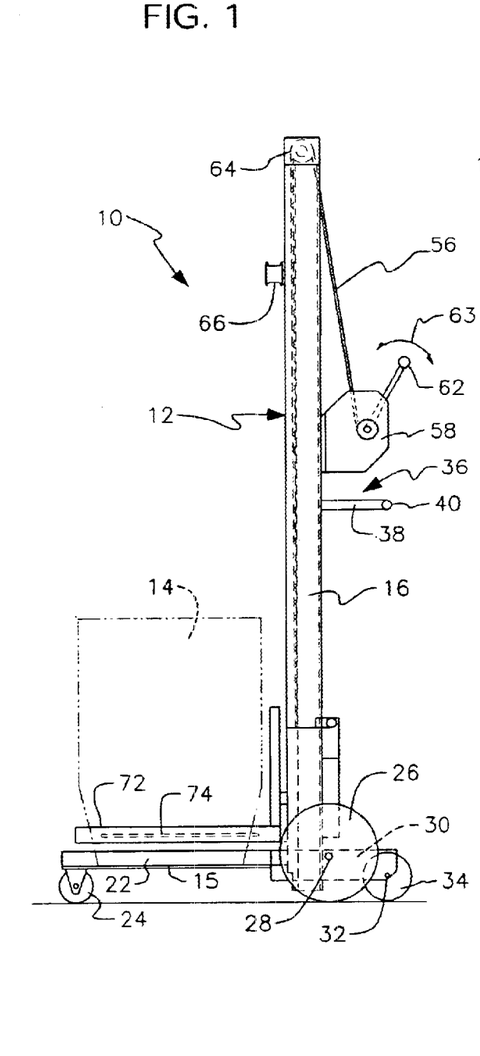
FIG. 1 is a side elevational view of an illustrative embodiment of the invention with a portable container outlined in broken lines.
Figure 2:
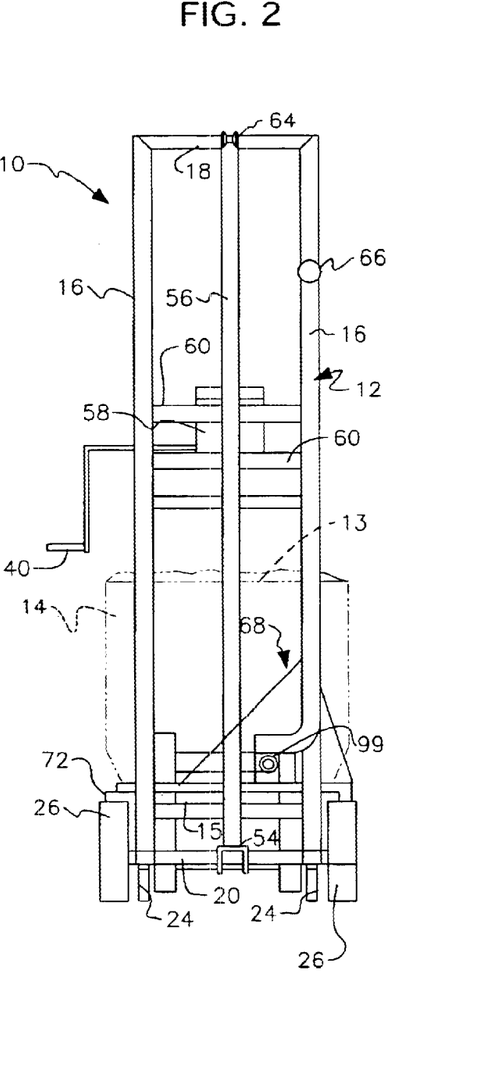
FIG. 2 is a front elevational view of an illustrative embodiment of the invention with the waste container outlined in broken lines and FIG. 2 is also is the first figure in a five figure animation that depict the lifting of the waste container by a winch and the rotating or tilting of the waste container that enables the contents of the waste container to fall therefrom into a larger waste receptacle.
Figure 3:
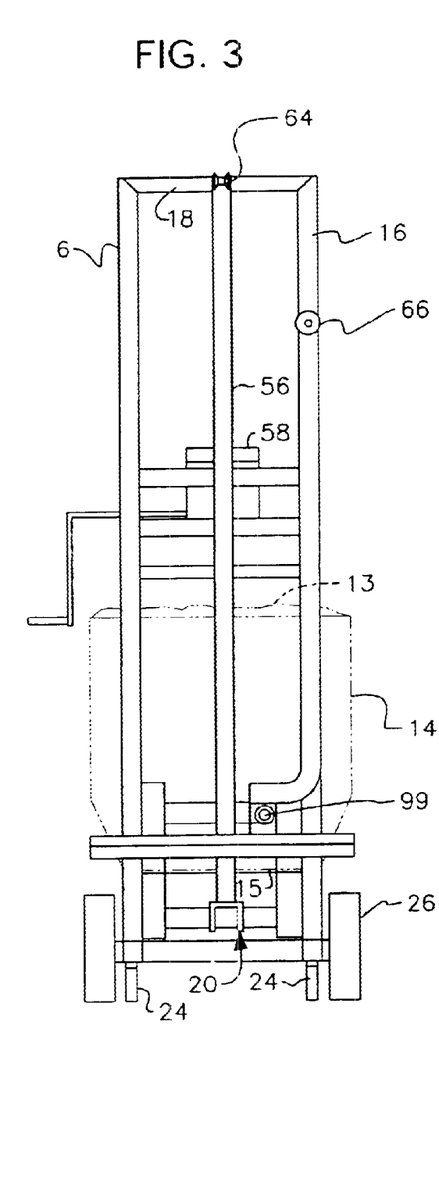
FIG. 3 is the second figure in said animation.

Referring now to FIG. 1, it will there be seen that the novel cart is denoted 10 as a whole. As best depicted in FIG. 2, cart 10 includes a back frame 12 that is approximately three times as tall as the height of portable waste container 14. Back frame 12 is formed by a pair of upstanding, parallel channel members 16, 16 that are interconnected at their respective upper ends by horizontally disposed top channel member 18 and at their respective lower ends by square tube member 20.

A pair of transversely opposed support arms in the form of square tubes 22, 22 are secured to the respective lower ends of channel members 16, 16 and extend horizontally therefrom in a forward direction in relation to said channel members. Swivelly-mounted caster wheels 24, 24, support their respective distal free ends. In FIG. 1, the "forward" side of cart 10 is the left or waste container 14 side and the "rearward" side is the right side where the operator stand or walks.

Pneumatic tires 26, 26 are rotatably mounted to primary axle 28 and the opposite ends of axle 28 are supported by flat plates 30, 30 that are secured to respective lower ends of upstanding channel members 16, 16 and which extend rearwardly therefrom as depicted in FIG. 1. Flat plates 30, 30 further support auxiliary axle 32 having auxiliary solid rubber tires 34, 34 secured to its opposite ends. Auxiliary tires 34, 34 are positioned rearwardly with respect to primary tires 30, 30. Said auxiliary tires 34, 34 facilitate the tilting back of cart 10 with tires 30, 30 raised from a support surface should the need arise.

Handle member 36, positioned about mid-height of vertical back frame 12, includes rearwardly extending, horizontally disposed, parallel rods 38, 38 secured to upstanding channel members 16, 16, respectively. Rod 40 interconnects rods 38, 38. A user grasps rod 40 when cart 10 is transported.

Figure 4:
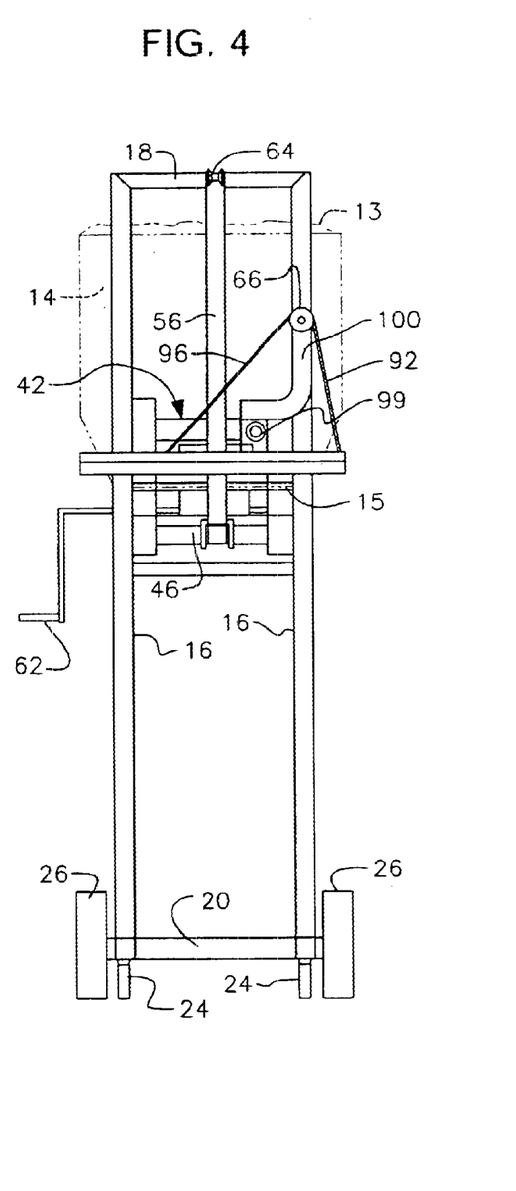
FIG. 4 is the third figure in said animation.
Figure 5:
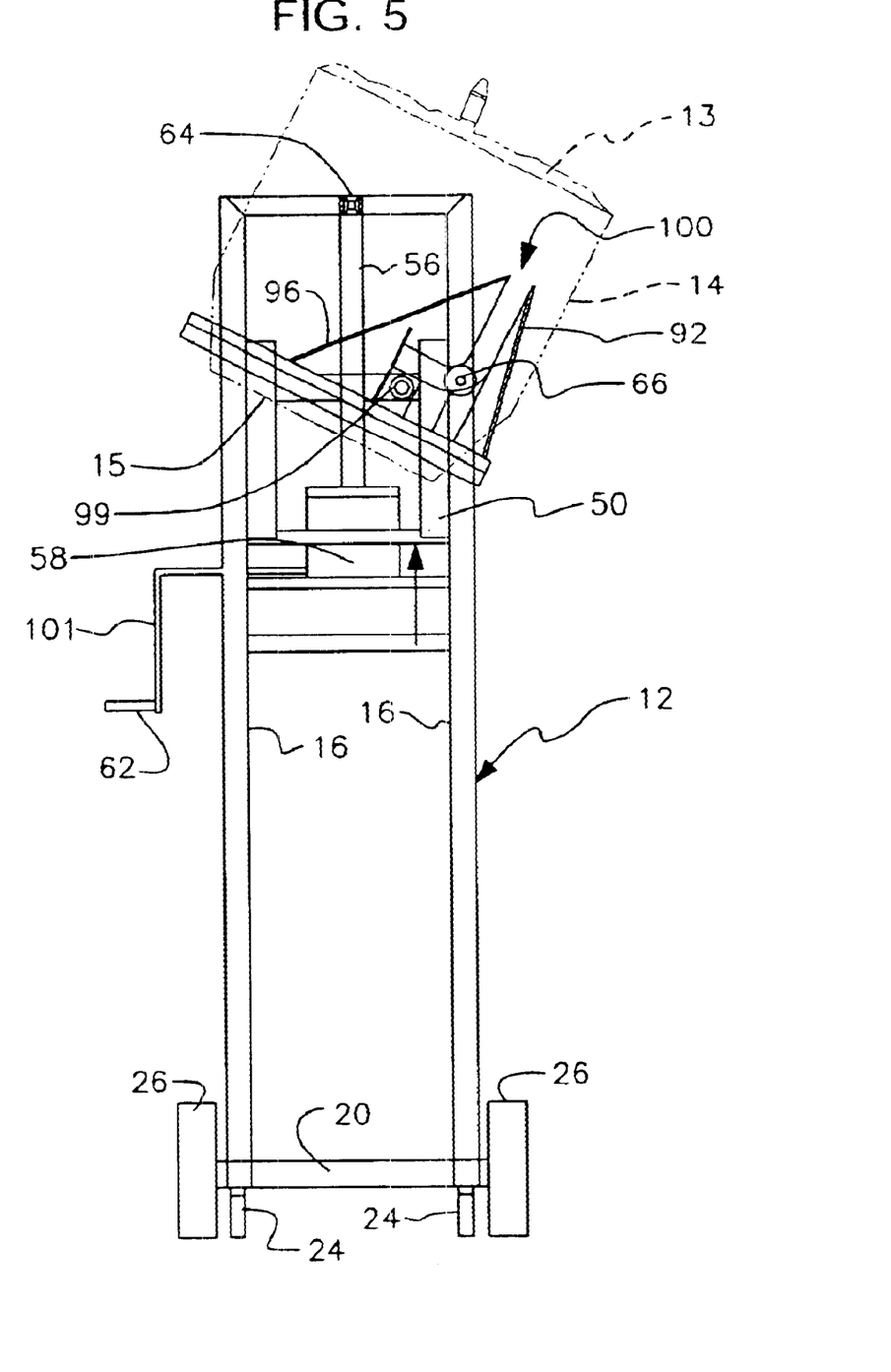
FIG. 5 is the fourth figure in said animation.
Figure 6:
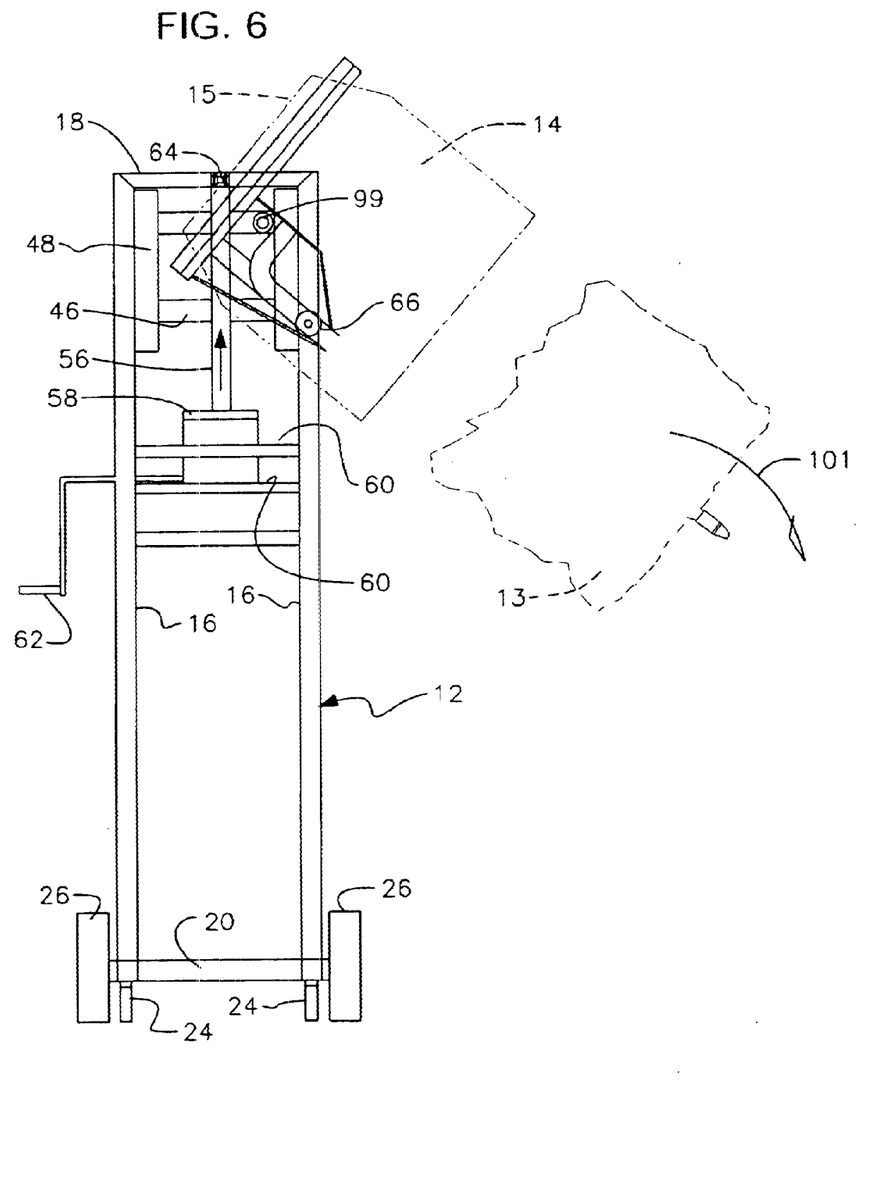
FIG. 6 is the fifth figure in said animation.

A comparison of FIGS. 1 and 2 indicates that waste container 14 is in a lowermost position of repose in FIG. 1 where it is supported by support arms 72, 72 and that said waste container 14 elevated in FIG. 2 with respect to said lowermost position. In FIG. waste container 14 is still further elevated; note that bottom wall 15 thereof has cleared pneumatic tires 26, 26. In FIG. 4, the elevation of waste container 14 is much more pronounced. In FIG. 5, waste container 14 has begun to tilt about a horizontal axis and in FIG. 6, waste container is rotated or tilted to an extent sufficient to enable its contents to fall therefrom under the influence of gravity. In FIG. 6, the content of waste container 14 is a waste-filled plastic bag 13.

Figure 7:
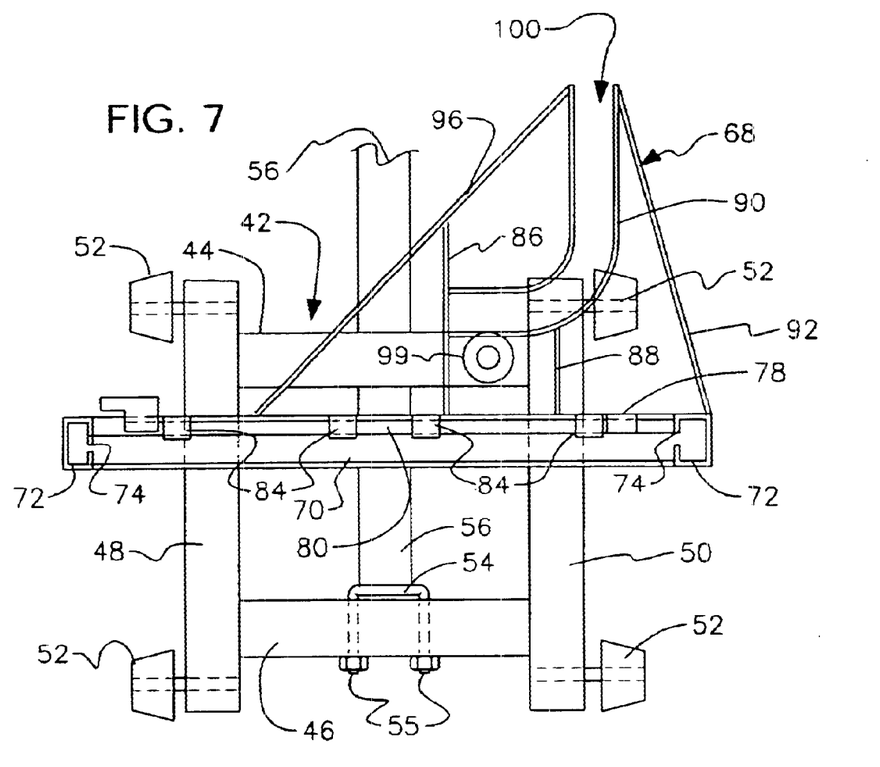
FIG. 7 is a detailed, front elevational view of the base frame and the waste container rotating means.
Figure 8:
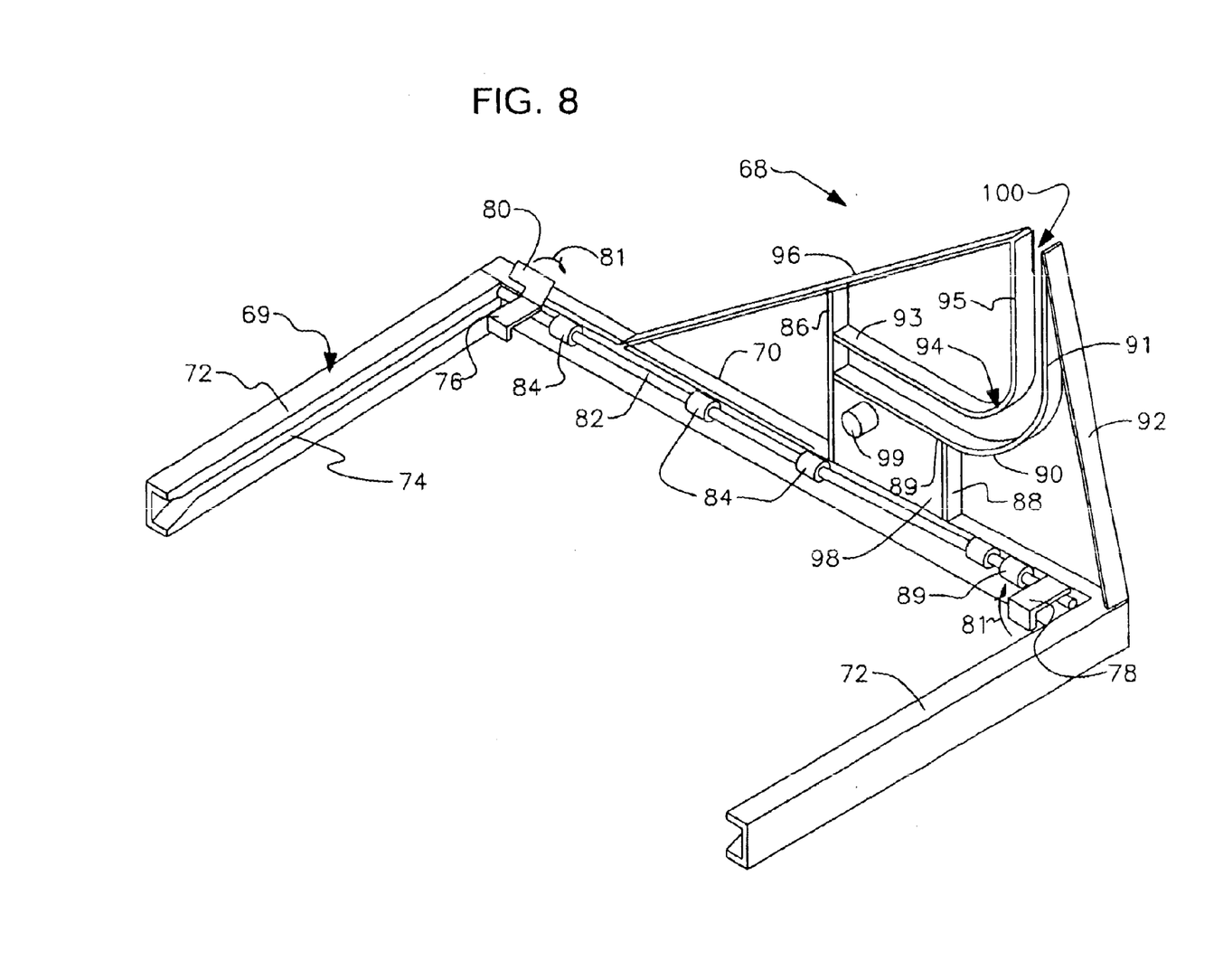
FIG. 8 is an isometric view of the waste container engaging means and the waste container rotating means.

The structure that lifts and empties waste container 14 is best understood in connection with FIGS. 7 and 8. Referring first to FIG. 7, base frame 42 includes two horizontally disposed square tubular members 44, 46 and two vertically disposed square tubular members 48, 50 that are welded together in an open square frame as depicted. A first pair of tapered nylon rollers, collectively denoted 52, are rotatably mounted to opposite ends of square tubular member 48 and a second pair of said tapered nylon rollers, also collectively denoted 52, are rotatably mounted to opposite ends of square tubular member 50. Rollers 52 fit within and are guided by upstanding channel members 16, 16.

Lower horizontal frame member 46 is suitably apertured to receive the opposed arms of inverted "U" clamp 54 as depicted in said FIG. 7. The nuts that secure said "U" clamp to frame member 46 are collectively denoted 55. A small, unnumbered clearance space is visible in FIG. 7 between a horizontal part of said "U" clamp and frame member 46. The lower end of an elongate, vertically disposed fabric winch 56 engages said horizontal part of said "U" clamp 54. It should therefore be understood that take-up of winch strap 56 lifts base frame 42 and that said base frame remains within the plane defined by vertical back frame 12 of cart 10 due to the captured relation of nylon tapered wheels 52 relative to vertical channel members 16, 16. Play out of winch strap 56 lowers base frame 42 under the influence of gravity.

As best understood in connection with FIGS. 1 and 2, winch 58 is mounted to a pair of horizontally disposed mounting members, collectively denoted 60, that span the distance between upstanding channel members 16, 16. The opposite ends of mounting members 60, 60 are secured to said upstanding channel members 16, 16. Winch 58 is mounted so that it extends to the rearward side of cart 10, as depicted in FIG. 1, so that it does not interfere with the path of travel of waste container 14 as it is lifted by winch strap 56. As suggested by double-headed directional arrow 63 in FIG. 1, an operator rotates crank handle 62 in a first direction to cause winch 58 to take-up winch strap 56, thereby lifting waste container 14, and in a second direction, opposite to the first direction, to cause the winch to play out said winch strap, thereby lowering waste container 14.

Winch strap 56 passes over pulley 64 that is rotatably mounted within the confines of top channel member 18, said top channel member 18 being oriented so that it is open at the bottom to receive winch strap 56.

Winch 58 may be provided in the form of a commercially available boat winch. It includes an internal clutch that prevents waste container 14 from free falling if the winch were to fail. In an alternate embodiment, a battery-operated reversible electric motor, not shown, could be connected in driving relation to winch 58 in lieu of crank handle 62.

The structure that effects tilting of waste container 14 as it nears the top of cart 12 is best depicted in FIGS. 7 and 8 as aforesaid but understanding its operation also requires consideration of FIGS. 1–6. Barrier means or cam roller 66 is secured to a preselected upstanding channel member 16. Cam roller 66 can rotate about an axis of rotation, but it cannot be displaced upwardly or downwardly relative to said upstanding channel member 16. Thus, it serves as a barrier means. Specifically, when winch 58 lifts waste container 14, said waste container encounters barrier means 66 and is rotated by it so that the contents of the waste container fall therefrom into a dumpster or other waste-collection receptacle.

The vertical height of cam roller 66 may be changed as desired so that the height at which waste container 14 is tilted may be changed as may be required in differing applications.

The waste container rotating means that cooperates with cam roller or barrier means 66 to rotate waste container 14 as it is lifted by winch 58 is denoted as a whole by the reference numeral 68 in FIGS. 7 and 8. Waste container rotating means 68 surmounts square tube member 70 that is the back frame member of waste container engaging means 69. Back frame 70 is secured as indicated in FIG. 7 to vertical frame members 48 and 50 of base frame 42.

As best understood in connection with FIGS. 1 and 8, container-engaging arms 72, 72, in the form of square tubes, are secured to opposite ends of square tube member 70 and project forwardly therefrom in a horizontal plane. Slots 74, 74 are milled or otherwise formed in the respective confronting walls thereof. An unillustrated flange formed in opposite sides of waste container 14, near bottom wall 15 thereof, is slideably engaged in each of said slots 74, 74 when waste container 14 is retrieved from a compactor, not shown.

However, retaining means are also needed to prevent waste container 14 from sliding out of slots 74, 74. That retaining means is provided in part by an unillustrated upturned lip formed on the rearward side of waste container 14. A lip of the same construction is also provided on the forward side of the waste container so that the operator need not distinguish between said front and rear sides. Clips 76 and 78 that are positioned near but not secured to opposite ends of square tube 70 as best indicated in FIG. 8 engage that upturned lip. Clip 76 includes a foot pedal 80 that when stepped upon, rotates clips 76, 78 out of engaging relation to said upturned lip. Clip 78 has no foot pedal, but it rotates conjointly with clip 76 because both of said clips are secured to rod 82 that is rotatable about its longitudinal axis. Rod 82 is made of plural straight sections joined to one another by truncate sleeves 84 that are welded or otherwise secured to square tube 70. Stepping on foot pedal 80 causes it to rotate in the manner indicated by directional arrow 81 and further causes clip 78 to rotate in the manner also indicated by a directional arrow 81. Such upward rotation disengages downwardly turned clips 76, 78 from the unillustrated upwardly turned lip formed integrally with waste container 14. A bias means, not shown, may be employed to return clips 76, 78 to their respective positions of repose when foot pedal 80 is released, or foot pedal 80 may be returned to its FIG. 8 position by lifting it with the same foot used to depress it.

In the alternative, the respective vertical parts of clips 76, 78 could be tilted rearwardly so that they are shoved out of the way, i.e., lifted when the waste container is retrieved. The bias means would bring them downwardly into locking engagement with the unillustrated lip and foot pedal 80 would then be required only during the release operation that is performed after the empty waste container is returned to the compactor.

Significantly, the height of arms 72, 72 relative to a horizontal support surface is preselected so that said arms are aligned with the unillustrated waste container flanges when the waste container is positioned in operative relation to the compactor. The operator opens the door of the compactor to expose the waste container and pushes cart 10 into the compactor so that slots 74, 74 formed in arms 72, 72 slideably engage said unillustrated flanges formed in waste container 14. The engagement of such flanges and slots 74, 74 and the engagement of the above-described upturned lip by clips 76, 78 prevents waste container 14 from falling when it is rotated or tilted.

After the operator has retrieved waste container 14 from the compactor, cart 10 is used to transport the waste container to a larger waste receptacle. Clips 76, 78 are not released until the emptying operation is over and the waste container has been returned to the compactor. Stepping on foot pedal 80 then allows the operator to remove cart 10 from the compactor, leaving an empty waste container 14 in operative relation to the compactor.

Structure 68 that rotates waste container 14 is mounted in upstanding relation to square tube 70 as aforesaid. It should therefore be understood that structure 68 is positioned in a vertical plane parallel to the vertical plane of upstanding channel members 16, 16 of cart 10. Structure 68 includes a pair of upstanding flat frame members denoted 86, 88, the former having a greater extent than the latter as depicted. Curved frame member 90 has a horizontal part 89 and a vertical part 91 that are formed integrally with one another and joined to one another by a gradual ninety-degree bend. A first end of curved frame 90 is secured to upstanding flat frame 86 in normal relation thereto so that said horizontal section 89 extends from upstanding flat frame 86 in a horizontal plane. Upstanding flat frame 88 is parallel to upstanding flat frame 86 and supports horizontal section 89 of curved frame 90 as depicted. An upwardly turned ninety-degree bend is formed in curved frame 90 to form vertical part 91. The upper end of vertical part 91 is secured to first side support flat frame 92 that extends at a preselected angle relative to a vertical plane between a preselected end of square tube 70 and the upper end of vertical part 91. Similarly, a second curved frame 94 having a straight horizontal section 93 and a straight vertical section 95 is secured at a first end to upstanding flat frame 86 and its upper end is secured to inclined flat frame 96 having a first end secured to square tube 70. Flat frame 96 is supported substantially mid-length thereof by upstanding flat frame 86.

Structure 68 further includes a flat mounting plate 98 that is bordered at its top by horizontal section 89 of curved plate 90, at its bottom by square tube 70, and at its sides by upstanding flat frames 86, 88.

As best understood in connection with FIG. 7, pintle or axle member 99 is mounted to horizontal frame 44 of base frame 42 and projects therefrom in a forwardly direction, i.e., toward waste container 14. Base frame 42 rotates about axle member 99 when the waste container is under rotation. Axle member 99 also serves to support base frame 42 when said base frame is not under rotation.

Curved frames 90 and 94 are spaced apart from one another a fixed, predetermined distance to form a curved track 100 therebetween. As best understood in connection with FIGS. 4-6, the upper end of track 100 receives roller cam 66 when container 14 attains the height depicted in FIG. 4. As winch 58 continues to raise waste container 14, as indicated in FIG. 5, fixed position roller cam 66 encounters the bend in track 100 and waste container 14 is constrained to rotate about said roller cam 66 until it is tilted as depicted. Note that roller cam 66 is positioned substantially in the middle of the curve of track 100 at this point. Continued lifting of waste container 14, as depicted in FIG. 6, causes waste container 14 to tilt even further so that refuse bag 13 falls therefrom under force of gravity as suggested by directional arrow 101. Note that roller cam 66 has returned to the uppermost end of track 100 at this point.

Winch 58 is then reversed and waste container 14 is lowered. Track 100 interacts with roller cam 66 to return waste container 14 to its upright configuration as it is lowered. Again, base frame 42 rotates about axle member 99 during the rotation of waste container 14 and base frame 42.

Figure 9:
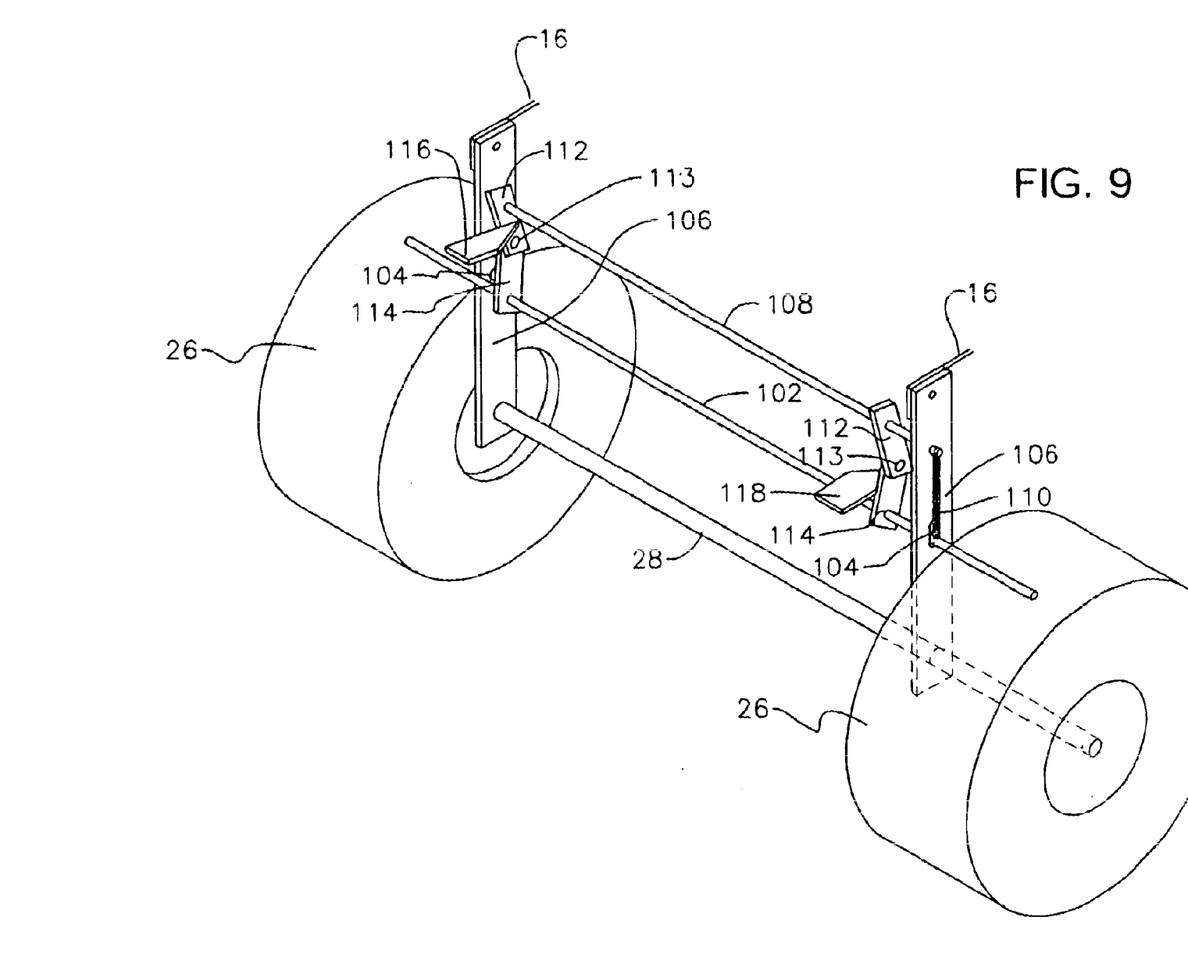
FIG. 9 is a rear isometric view of the braking mechanism of the cart in the braked mode.
Figure 10:
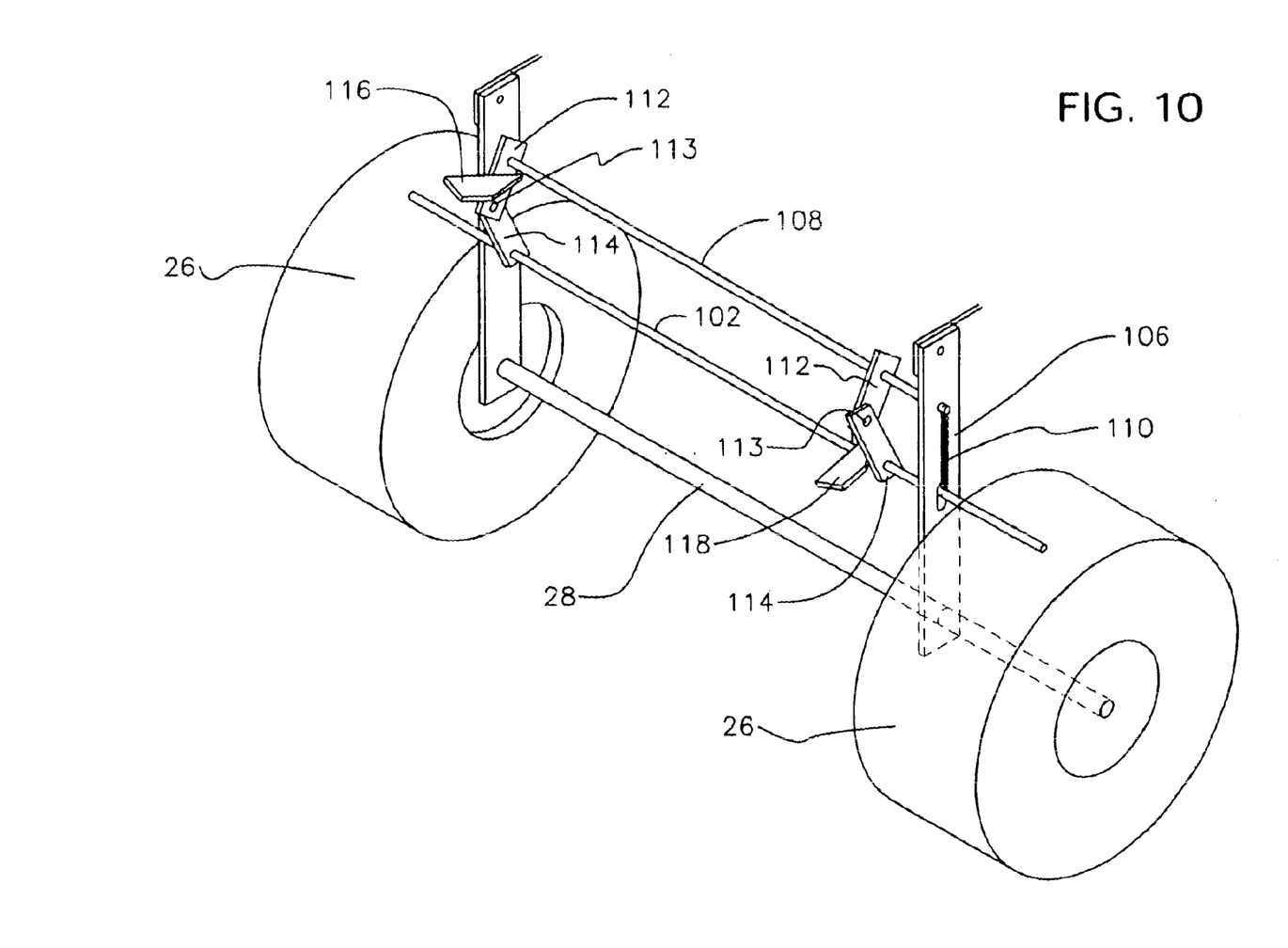
FIG. 10 is a rear isometric view of the FIG. 9 structure in the brake-released mode.

It is important to lock tires 26, 26 of cart 10 when the cart is not in use. The means for locking said tires is depicted in FIGS. 9 and 10. A tire-locking, braking action is provided when opposite ends of braking rod 102 bears against tires 26, 26 as depicted in FIG. 9. FIG. 10 depicts braking rod 102 when spaced away from said tires 26, 26 so that said tires are free to rotate about primary axle 28.

In FIG. 9, said opposite ends of braking rod 102 are positioned at the respective lower ends of slots 104, 104 formed in upstanding flat plates 106, 106. The respective upper ends of flat plates 106, 106 are secured to channel members 16, 16 of back frame 12. The respective lower ends of flat plates 106, 106 are apertured to receive the opposite ends of primary axle 28 and the respective upper ends of said flat plates are apertured to receive opposite ends of mounting rod 108. A tension spring 110 extends in interconnecting relation between rods 108 and 102 at their respective opposite ends so that when said springs 110 are in repose, braking rod 102 is pulled upwardly so that it is spaced away from tires 26, 26 as depicted in FIG. 9. As aforesaid, the opposite ends of braking rod 102 are positioned at the upper end of slots 104, 104 when said braking rod 102 is spaced apart from said tires.

A foot-operated linkage is provided to actuate the lowering of braking rod 102 into braking relation to tires 26, 26. Truncate upper links 112, 112 are apertured to receive opposite ends of mounting rod 108. There is no relative movement between said mounting rod 108 and said upper links 112, 112 so that rotational movement of said upper links is simultaneously imparted to said mounting rod 108. The same type of connection is made between lower links 114, 114 and braking rod 102 so that rotation of said lower links imparts simultaneous and corresponding rotation to said braking rod. Upper links 112, 112 are pivotally connected as at 113, 113 to lower links 114, 114.

As indicated in FIG. 10, when braking rod 102 is in repose, spaced apart from tires 26, 26, links 112, 114, and 112, 114 are pivoted rearwardly with respect to waste container 14, i.e., toward the user. To overcome the bias of tension springs 110, 110, the user steps on foot lever 116 at the left side of braking rod 102. This causes links 112, 114 and 112, 114 to rotate about their respective pivot points 113, 113 into their respective FIG. 9 positions where said links are pivoted in a forward direction, i.e., toward waste container 14. This is a "cam-over-center" displacement in that the links will remain in that position, and braking rod 102 will remain in braking relation to tires 26, 26 until an external force is applied to overcome the cam-over-center force. That cam-over-center overcoming force is supplied by the user by depressing foot lever 118 at the right side of braking rod 102. Depressing foot lever 118 rotates said foot lever away from said links and rotates braking bar 102 to which said foot lever 118 is secured for conjoint rotation so that bias members 110, 110 return braking rod 102 to its in repose position and return links 112, 114, 112, 114 to their FIG. 10 position of repose where the braking action is released.

The inventive structure is safe to handle, easy to operate, and reliable. Significantly, an operator of cart 10 need not possess any special skills. The interaction of barrier means 66 and track 100 that tilts or rotates waste container 14 into its FIG. 6 position requires no special skill of the operator. Nor is any special skill required to lower the waste container. The operator merely needs to operate winch means 58 to raise and lower said waste container 14. The elegant structure of the barrier means and track includes a wide tolerance so that the unit will not jam or otherwise become inoperative. The primary wheels make the device easy to push from place to place and the auxiliary wheels make it easy to tilt backward to overcome a curb or the like. The foot-operated braking means is also reliable, durable and easy to operate, as is the foot-operated latching means that engages the waste container to the cart. The frame-like construction of the novel cart and its use of readily available materials such as channel members, rods, flat plates, square tubes and the like, makes it economical to manufacture and affordable to the waste removal industry. The novel cart and novel container thus combine to facilitate the retrieval, transporting, lifting, and emptying of the waste container in the substantial absence of physical exertion by the cart operator.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,
What is claimed is:

1. A cart adapted to retrieve a portable waste container from a compactor, to transport the portable waste container to a larger waste receptacle, and to lift and rotate the waste container to empty the contents of said waster container into said waste receptacle, comprising:
   a vertical frame including a pair of parallel, transversely opposed channel members;
   a base frame positioned between and adapted to movably engage said channel members;
   said base frame being movable between an upper end of said vertical frame and a lower end of said vertical frame;
   a waste container-engaging frame secured to said base frame;
   said waste container-engaging frame including a back frame secured to said base frame and a pair of parallel container-engaging arms secured to opposite ends of said back frame, said parallel container-engaging arms disposed in a horizontal plane normal to said back frame;
   winch means for selectively lifting and lowering said base frame along the vertical extent of said vertical frame;
   a barrier means fixedly secured to a preselected one of said channel members of said vertical frame;
   a waste container rotating means secured to said back frame;
   a track formed in said waste container rotating means, said track having a vertical part, a horizontal part, and a gradual ninety degree bend in open communication with said vertical and horizontal parts;
   said track being in vertical alignment with said barrier means so that said barrier means enters into said track when said winch means lifts said base frame to a first preselected elevation above said barrier means;
   said waste container being gradually rotated as said barrier means encounters said gradual ninety degree bend as said winch means lifts said base frame to a second preselected elevation above said first preselected elevation; and
   said waste container-engaging means adapted to hold said waste container as said waste container is rotated so that contents of said waste container fall from said waste container under the influence of gravity when said waste container is rotated.

2. The cart of claim 1, further comprising:
   a pair of parallel, horizontally disposed support arms;
   said pair of support arms including a first support arm connected to a lower end of a first channel member of said pair of channel members and extending forwardly in cantilevered relation therefrom;
   said pair of support arms further including a second support arm connected to a lower end of a second channel member of said pair of channel members and extending forwardly in cantilevered relation therefrom.

3. The cart of claim 1, wherein said vertical frame further includes:
   a horizontal top frame that interconnects respective uppermost ends of said pair of channel members;
   a horizontal bottom frame that interconnects respective lowermost ends of said pair of channel members; and
   at least one horizontal interconnecting frame that interconnects said channel members at a preselected location between said top and bottom frames; and
   said winch means being mounted to said at least one horizontal interconnecting frame.

4. The cart of claim 3, further comprising connection means for interconnecting said winch means and said back frame so that operation of said winch means in a first direction lifts said base frame and so that operation of said link in a second direction lowers said base frame.

5. The cart of claim 4, wherein said connection means is a belt.

6. The cart of claim 5, further comprising:
   a pulley mounted to said horizontal top frame;
   said belt following a path of travel that extends upwardly from said winch means, over said pulley, and downwardly to said base frame.

7. The cart of claim 6, said base frame further comprising:
   a pair of vertical base frame members that define opposite sides of said base frame;

a pair of horizontal base frame members that interconnect said pair of vertical base frame members to each other;

engaging means for enabling said belt to engage a preselected horizontal base frame member of said pair of horizontal base frame members.

8. The cart of claim 7, further comprising:

a first upper wheel engaged to an upper end of said first vertical base frame member on an outboard side thereof;

a second upper wheel engaged to an upper end of said second vertical base frame member on an outboard side thereof;

a first lower wheel engaged to a lower end of said first vertical base frame member on an outboard side thereof; and a second lower wheel engaged to a lower end of said second vertical base frame member on an outboard side thereof;

said first upper and lower wheels disposed in engaging relation to a first channel member of said pair of vertical channel members;

said second upper and lower wheels disposed in engaging relation to a second channel member of said pair of vertical channel members;

whereby said base frame is constrained to travel upwardly and downwardly between said first and second channel members when said winch member is operated in a first direction and a second direction, respectively.

9. The cart of claim 1, wherein said waste container rotating means is secured to said back frame in upstanding relation thereto.

10. The cart of claim 1, further comprising a slot formed in each waste container-engaging arm of said pair of parallel waste container-engaging arms, each slot adapted to slidingly receive a flange formed in said waste container on opposite sides thereof, said grooves retaining said flange when said waste container is engaged by said cart.

11. The cart of claim 10, wherein said container-engaging arms are positioned at a predetermined height equal to the height of said waste container flange when the waste container is in operative relation to the compactor so that said slots engage said flange when said waste container is retrieved from said compactor by said cart.

12. The cart of claim 10, further comprising retainer means adapted to prevent said waste container from sliding from said slots when said waste container is lifted and rotated.

13. The cart of claim 12, wherein said retainer means includes a pair of pivotally mounted, generally "L"-shaped first and second retainers adapted to releasably engage a generally "L"-shaped lip formed in said waste container.

14. The cart of claim 13, further comprising:

a plurality of truncate sleeves secured to said back frame member;

an elongate rod means extending in ensleeved relation through each of said truncate sleeves, said elongate rod means being rotatable about a longitudinal axis of symmetry within said truncate sleeves;

said "L"-shaped retainers being secured to opposite ends of said elongate rod in rotational alignment with one another;

a lever formed integrally with said first retainer, said elongate rod providing a fulcrum for said lever;

a bias means for holding said lever in a position of repose where said first retainer and hence said second retainer are disposed in engaging relation to said "L"-shaped lip formed in said waste container;

said lever adapted to be pivoted about said fulcrum by an operator, said lever when pivoted out of said position of repose effecting simultaneous and corresponding rotation of said elongate rod about its longitudinal axis so that said first retainer and said second retainer conjointly release said "L"-shaped lip formed in said waste container;

said lever when released being returned by said bias means to said position of repose where said first and second retainers engage said "L"-shaped lip and prevent sliding of said waste container from said grooves.

15. The container of claim 1, further comprising:

a vertically disposed, primary tire-mounting first plate secured to a first channel member of said pair of channel members at a lower end thereof;

a vertically disposed, primary tire-mounting second plate secured to a second channel member of said pair of channel members at a lower end thereof;

said primary tire-mounting first plate having a first aperture formed therein near an upper end thereof, a vertically extending slot formed substantially mid-length thereof, and a second aperture formed near a lower end thereof;

said primary tire-mounting second plate having a first aperture formed therein near an upper end thereof, a vertically extending slot formed substantially mid-length thereof, and a second aperture formed near a lower end thereof;

a mounting rod having its respective opposite ends rotatably positioned in said respective first apertures formed in said primary tire-mounting first and second plates at said respective upper ends thereof;

a braking rod having its respective opposite ends slideably positioned in said respective slots formed in said primary tire-mounting first and second plates;

an axle rod having its respective opposite ends slideably positioned in said respective apertures formed in said primary tire-mounting first and second plates at said respective lower ends thereof;

a first bias means positioned in interconnecting relation between a first end of said mounting rod and a first end of said braking rod;

a second bias means positioned in interconnecting relation between a second end of said mounting rod and a second end of said braking rod;

said first and second bias means operative to position said braking rod at an upper end of said respective slots when said first and second bias means are in repose;

a first primary tire rotatably mounted to a first end of said axle rod;

a second primary tire rotatably mounted to a second end of said axle rod;

a brake means for overcoming said bias means and urging said braking rod into tight frictional engagement with said first and second primary tires so that said first and second primary tires cannot rotate when said bias means has been overcome.

16. The cart of claim 15, wherein said brake means further comprises:

a first locking plate having an aperture formed in its opposite ends, said first locking plate positioned at a first end of said mounting rod and said first end of said mounting rod being received within an upper aperture of said pair of apertures formed in said first locking plate;

a second locking plate having an aperture formed in its opposite ends, said second locking plate positioned at a second end of said mounting rod and said second end of said mounting rod being received within an upper aperture of said pair of apertures formed in said first locking plate;

a third locking plate having an aperture formed in its opposite ends, said third locking plate positioned at a first end of said braking rod and said first end of said braking rod being received within a lower aperture of said pair of apertures formed in said third locking plate;

a fourth locking plate having an aperture formed in its opposite ends, said fourth locking plate positioned at a second end of said braking rod and said second end of said braking rod being received within a lower aperture of said pair of apertures formed in said fourth locking plate;

said first and second locking plates being pivotally joined to one another at a first pivot point defined by said lower aperture of said first locking plate and said upper aperture of said second locking plate;

said third and fourth locking plates being pivotally joined to one another at a second pivot point defined by said lower aperture of said third locking plate and said upper aperture of said fourth locking plate;

said first and second pivot points being positioned on a rearward side of said wheel mounting plates when said bias means is in repose;

said first and second pivot points being positioned on a forward side of said wheel mounting plates when said bias means is not in repose;

locking means for displacing said first and second pivot points from said rearward side of said wheel-mounting plates to said forward side of said wheel-mounting plates; and unlocking means for displacing said first and second pivot points from said forward side of said wheel-mounting plates to said rearward side of said wheel-mounting plates;

whereby a cam-over-center locking of said braking rod against said tires is accomplished when said locking means is employed to displace said first and second pivot points from said rearward side of said wheel-mounting plates to said forward side of said wheel-mounting plates.

17. The cart of claim 1, further comprising:

a first tire-mounting plate secured to a first channel member of said pair of channel members at a lower end thereof;

a second tire-mounting plate secured to a second channel member of said pair of channel members at a lower end thereof;

a first aperture formed in a lower end of said first tire-mounting plate;

a second aperture formed in a lower end of said second tire-mounting plate;

an axle rod having opposite ends that extend through said first and second apertures by an amount sufficient to respectively support a first and second tire thereon, on an outboard side of said first and second tire-mounting plates;

a first primary tire and a second primary tire rotatably mounted to said opposite ends of said axle rod;

whereby said first and second primary tires facilitate transportation of said cart across a support surface.

18. The cart of claim 17, further comprising:

a first cantilevered arm extending rearwardly from a lower end of said first channel member;

a second cantilevered arm extending rearwardly from a lower end of said second channel member;

a first auxiliary tire rotatably-mounted to a rearward end of said first cantilevered arm; and a second auxiliary tire rotatably mounted to a rearward end of said second cantilevered arm.

19. The cart of claim 18, further comprising:

a first caster wheel rotatably mounted to a forward end of said first support arm;

a second caster wheel rotatably mounted to a forward end of said second support arm;

said first and second caster wheels supporting respective forward ends of said first and second support arms;

said first and second support arms, together with said first and second primary tires and said first and second caster wheels, collectively enabling said cart to be transported over a support surface.

\* \* \* \* \*